Aug. 12, 1924.

S. E. ROSS 1,504,511

NUT LOCK

Filed Dec. 9, 1921        2 Sheets-Sheet 1

Inventor
S. E. Ross,
By Watson, Coit, Morse & Grindle,
Attorney

Aug. 12, 1924.                    1,504,511
S. E. ROSS
NUT LOCK
Filed Dec. 9, 1921           2 Sheets-Sheet 2
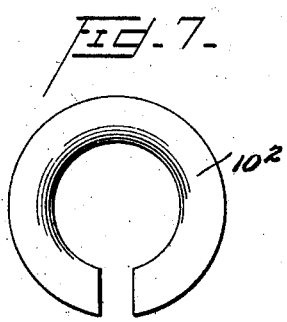
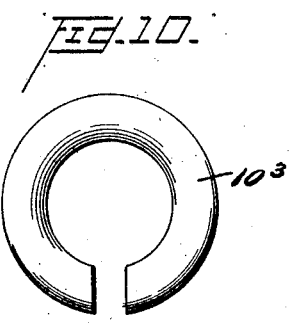
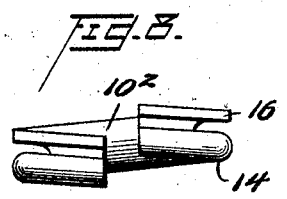
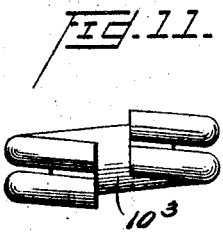
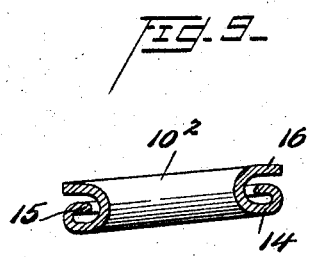
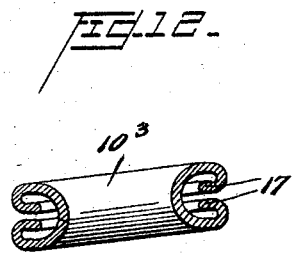

Patented Aug. 12, 1924.

1,504,511

UNITED STATES PATENT OFFICE.

SAMUEL E. ROSS, OF EVANSTON, ILLINOIS.

NUT LOCK.

Application filed December 9, 1921. Serial No. 521,228.

*To all whom it may concern:*

Be it known that I, SAMUEL E. ROSS, a citizen of the United States, and residing at Evanston, county of Cook, State of Illinois, have invented certain new and useful Improvements in Nut Locks, of which the following is a specification.

The present invention relates to nut locks and particularly to nut locks designed for use at points where they are subjected to great vibration and strain. It is the object of the invention to provide a nut lock of this class which is adapted to accomplish all of the duties of the ordinary nut lock and in addition to provide a greater friction, a wider latitude of elasticity than is possible in the ordinary nut lock, to compress in thickness, to absorb considerable shock and vibration when used on vibrating structures, to prevent stretching of the bolts with which they are used, to enable the loads to be borne by several adjacent bolts to be equalized accurately when a plurality of bolts are used in the same structure and, in general, to provide a nut lock of great capacity, long life and adaptability.

In the drawings:

Figs. 7, 8 and 9 are views of a second modification; and

Figs. 10, 11 and 12 are views of a third modification.

Figure 1:
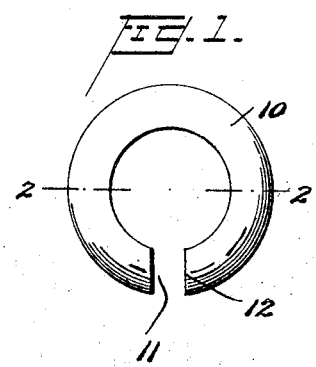
Fig. 1 is a plan view of one form of nut lock formed in accordance with the invention.
Figure 4:
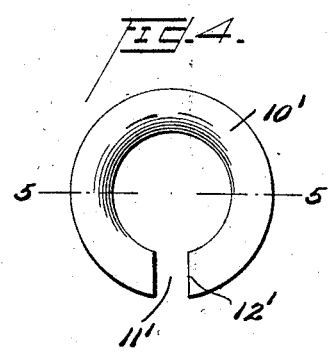
Figs. 4, 5 and 6 are views similar respectively to Figures 1, 2 and 3 but showing a second form of the improved nut lock.
Figure 2:
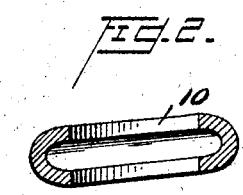
Fig. 2 is a section on line 2—2 of Figure 1.
Figure 5:
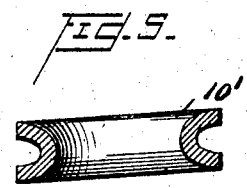
Figure 3:
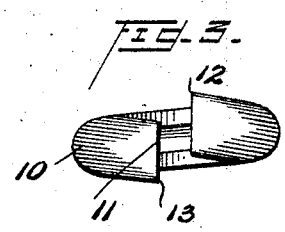
Fig. 3 is a side view of the nut lock.
Figure 6:
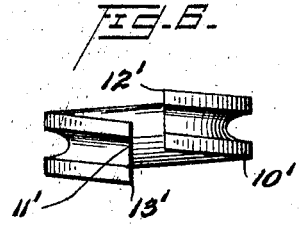

The first form of the nut lock is illustrated in Figures 1, 2 and 3 and it will be seen that it consists of a substantially annular metal member 10 having a U-shaped cross section and cut away at 11 in the usual manner, the ends of the nut lock being axially displaced to provide biting edges 12 and 13. In the form of the invention illustrated in Figures 1, 2 and 3 the groove or channel of the nut lock faces interiorly, whereas, in the form illustrated in Figures 4, 5 and 6 the groove is external, otherwise the two forms are identical. The same numerals are used in the drawings of the invention to indicate like parts, the numerals of the modifications having exponents added. The nut locks are fabricated or a suitable grade of spring steel and heat treated to obtain the physical properties desired for the particular use for which they are designed.

The nut lock just described may be used for all purposes for which the ordinary nut lock may be employed, but is especially designed so that it can be compressed for heavy duty and where the bolt strain to be withstood is great and where there is great shock and vibration.

When the nut lock is applied to a bolt and the nut tightened the two ends are first brought into a plane parallel to the face of the nut in the usual manner. One of the biting edges then engages the face of the nut and the opposite biting edge then engages the structure through which the bolt extends. The nut lock constantly tends to resume its original shape as shown in Figure 3 and the biting edges are contsantly pressed against the nut and the member on the opposite side of the nut lock so that the nut cannot accidentally become unscrewed.

If additional pressure is exerted on the nut to tighten the same the two flanges of the nut lock will be forced toward each other and this transverse compression of the nut lock may be considerable within the elastic limit of the metal of which it is fabricated. The nut lock constantly tends to expand and exerts pressure against the nut at substantially all points of a complete circle. This force, due to the transverse compression of the nut lock, can be varied at will by adjusting the nut and may conveniently be greater than that produced by ordinary wrench tightening of the nut without exceeding the elastic limit of the nut lock, so that there is always a reserve. When in this condition a great force is exerted on the nut to prevent its unscrewing and yet the nut lock is elastic and capable of absorbing shock and vibration.

The grooved nut lock holds a reserve of elasticity and in case great force is exerted tending to stretch the bolt or strip the threads of the nut and bolt, the flanges of the nut lock will close together before the elastic limit of the bolt is exceeded and act as a cushion in taking up the strain on the bolt.

The operator applying a bolt can accurately judge the stress in the bolt as he tightens the nut by observing the extent of movement of the flanges of the nut lock toward each other. The nut lock acts therefore as a pressure gauge, preventing the overstressing of a bolt when used by itself and enabling the operator to equalize the loads of several adjacent bolts passing through the same structure so that each bolt carries its proper share of the load, and also enables the operator to equalize the bolt pressure on analogous structures. Other advantages of the invention will be apparent to those skilled in the art.

In the modified nut lock illustrated in Figures 7, 8 and 9 the lower flange is provided with an upwardly and inwardly turned intermediate portion 15 which acts as a further means to resist transverse compression. The upper flange 16 may be brought into contact by pressure with the intermediate flange 15 and still there will be a considerable reserve which will only be used up when the intermediate flange is brought into contact with the lower flange 14. An increasing force is brought against the nut therefor, as it is tightened.

As the nut lock can be considerably reduced in thickness by compression, it tends to prevent the turning off of nuts or stripping the threads while tightening up nuts, since the turning down of the nut brings greater and greater resistance to bear against it, gradually and not abruptly. In service it sometimes occurs that the nut lock loses its elasticity or spring between the upper and intermediate flanges 16 and 15 respectively, due to long continued use. By further turning up of the nut the reserve between the intermediate and lower flanges may be called on, thus rendering it unnecessary to discard the nut lock and use a new one.

By lengthening the life of the individual nut lock in this manner a considerable saving is effected where such nut locks are used in quantity.

The nut lock, exerting a pressure or friction against the nut which can be varied at will by adjusting the nut, renders it unnecessary to have a stock of nut locks of different thicknesses or cross sectional areas, for bolts of the same size, in order to increase the friction, as would be necessary where ordinary nut locks are used.

The nut lock is especially useful when used with bolts subjected to sudden and violent strains, since it may be compressed when the bolt is strained, and will resume its original shape when the strain is removed. It is formed in cross section similarly to a coiled spring and assumes its original position instantly when the force is removed, and is particularly adapted for use in structures subjected to vibration, jarring and tremor.

The modification illustrated in Figures 10, 11 and 12 has two intermediate flanges 17 and may be compressed through a greater distance than the other forms shown, and it will be obvious that still other modifications may be made within the scope of the invention. The grooves of the nut locks $10^2$ and $10^3$ may face either exteriorly or interiorly.

Having thus described the invention what is claimed as new and desired to be secured by Letters Patent is:

1. A nut lock of substantially annular form and constructed and designed concavo-convex in cross section to permit axial cross sectional deformation by bending within the elastic limit, the nut lock being cut at one point in its circumference to provide spaced ends, and the ends being displaced axially to provide biting edges on opposite sides thereof.

2. A nut lock of substantially annular form and grooved transversely to allow axial deformation by bending in radial planes thereof, the nut lock being cut at one point in a substantially radial direction to provide spaced ends, and the ends being displaced axially to provide biting edges on opposite sides of the nut lock.

3. A nut lock of substantially annular form and grooved transversely to allow axial compression thereof, said groove facing outwardly and the nut lock being cut at one point, in a substantially radial direction, to provide spaced ends, and the ends being displaced axially to provide biting edges on opposite sides of the nut lock.

4. A nut lock of substantially annular form and grooved transversely of its axis to allow axial compression thereof, an annular flange integral with the nut lock and springing from the same at one side of said groove, extending axially and inwardly into the groove and terminating in an annular rim or margin lying in said groove, the nut lock being cut at one point to provide spaced ends, and the ends being displaced axially to provide biting edges on opposite sides thereof.

5. A nut lock of substantially annular form and grooved transversely to allow axial compression thereof, an annular flange springing from the nut lock on each side of the groove and extending axially and inwardly into the groove and having its inner edge lying within the groove, said flanges being integral with the other portion of the nut lock, the nut lock being cut to provide spaced ends and the ends being displaced axially to provide biting edges on opposite sides of the nut lock.

In testimony whereof I hereunto affix my signature.

SAMUEL E. ROSS.